United States Patent
Zhang

(10) Patent No.: US 7,349,996 B2
(45) Date of Patent: Mar. 25, 2008

(54) METHOD AND SYSTEM FOR REMOTE MANAGEMENT OF DATA OVER A WIRELESS LINK

(75) Inventor: Frank Nan Zhang, Sunnyvale, CA (US)

(73) Assignee: Xecom, Inc., Milpitas, CA (US)

( * ) Notice: Subject to any disclaimer, the term of this patent is extended or adjusted under 35 U.S.C. 154(b) by 455 days.

(21) Appl. No.: 10/830,750

(22) Filed: Apr. 22, 2004

(65) Prior Publication Data

US 2005/0240682 A1    Oct. 27, 2005

(51) Int. Cl.
G06F 3/00 (2006.01)
G08B 23/00 (2006.01)

(52) U.S. Cl. ............... 710/2; 710/15; 340/870.02
(58) Field of Classification Search .............. 710/2
See application file for complete search history.

(56) References Cited

U.S. PATENT DOCUMENTS

| | | | |
|---|---|---|---|
| 6,076,099 A * | 6/2000 | Chen et al. | 709/202 |
| 6,424,931 B1 * | 7/2002 | Sigmar et al. | 702/188 |
| 6,526,807 B1 | 3/2003 | Doumit et al. | 73/40.5 R |
| 6,625,640 B1 | 9/2003 | Zou et al. | 709/200 |
| 7,058,524 B2 * | 6/2006 | Hayes et al. | 702/62 |
| 7,109,882 B2 * | 9/2006 | Angelis et al. | 340/870.02 |
| 2002/0173704 A1 * | 11/2002 | Schulze et al. | 600/300 |
| 2002/0199003 A1 | 12/2002 | Sacca | 709/228 |
| 2004/0225818 A1 * | 11/2004 | Han | 710/305 |
| 2005/0071093 A1 * | 3/2005 | Stefan | 702/60 |
| 2006/0056341 A1 * | 3/2006 | Takagi et al. | 370/328 |

* cited by examiner

Primary Examiner—Alford Kindred
Assistant Examiner—David Martinez
(74) Attorney, Agent, or Firm—Pillsbury Winthrop et al.

(57) ABSTRACT

A system and method for enabling remote management of data of devices using wireless communications. The system and method provides direct access to devices such as sensors from wireless devices having an integrated wireless transceiver and controller that are user programmable such a separate remote host controller is not required for managing the sensors. In one embodiment, a broadcast mode is provided wherein the wireless devices transmits a response for its corresponding sensors according to a predetermined sequence during a predetermined time slot according to a predetermined sequence.

13 Claims, 8 Drawing Sheets

METHOD AND SYSTEM FOR REMOTE MANAGEMENT OF DATA OVER A WIRELESS LINK

FIELD OF INVENTION

The present invention relates in general to wireless data communication, and more particularly to a system and method for remote monitoring, control, and data acquisition via wireless data communications.

BACKGROUND OF INVENTION

Sensors are typically used for measuring a physical or chemical quantity such as temperature, pH, pressure, volume, and converting this data into another form, such as an electrical signal. Early systems having sensors required a technician to physically attend to the sensor to control, monitor, and acquire data from the sensor; e.g., a utility meter. Systems were later developed to communicate electrically with the sensors for providing the control, monitoring, and data acquisition functions. Conventional systems required costly wiring to each sensor.

With the development of wireless communication means, management of the sensors, i.e., providing the control, monitoring, and data acquisition functions, could be performed remotely. Modems are typically used as a means for inexpensive data communication. A modem is referred to herein as a device to connect two hosts through a data link. Modems typically convert signals produced by one type of device, e.g., a computer, to a form compatible with another device, e.g., a telephone. Many applications use modems connected to a telephone line accessible through a public switched telephone network (PSTN) to pass the onsite sensor data to an applications controller, typically a central management server. PSTN refers to the international public telephone system that carries analog voice data. The term modem stands for mo(dulator)-dem(odulator) since a stream of digital data or binary bits (0's and 1's) is modulated for transmission into an analog signal within the bandwidth of the PSTN and the received analog signal is demodulated back to digital data.

With the advent of the personal computer (PC), applications were developed to more easily enable a user to interface the PC to the modem for communication to the PSTN. A set of predefined commands, known as "the AT command set" for modems was initially developed by the Hayes Micro Computer Company in the mid 1980's to control their proprietary modem equipment used for connecting data terminals to host computing devices over the public telephone network. The AT command set is now the industry standard adopted by most modem manufacturers for controlling modems and serial data transmission over telephone lines. The AT command set has a string of characters for each command, preceded by the prefix "AT", for sending instructions to the modem. The original AT Command set has been augmented many times as modem speeds and feature sets have increased. Special commands have been added by many vendors to control new features of their wired and wireless communication products.

More recently, the high production volumes and declining costs of cordless telephone technologies have made it cost effective to interconnect clusters of equipment together locally using wireless networks. As a result, the control, monitoring, and acquisition of data from remote sensors and other equipment from distant control centers using telephone and data networks has become more feasible. The cost of installing and maintaining the telephone lines or the wide-area data connections, however, is still prohibitive for low speed or occasional use communications. In addition, as the number of sensors increases, the cost and time required to control, monitor, and acquire data from the sensors also increases.

FIG. 1 is a block diagram depicting an exemplary prior art system 10 for applications using wireless devices such as modems for local data communications. The system 10 has two sensor-based nodes 14a, 14b, one corresponding to a sensor 16a and another for a sensor 16b. Although sensors 16a, 16b are shown, other non-sensors devices which require data management may be used. Similar prior art systems can include any number of sensor nodes, and are not limited to two such nodes. System 10 typically includes a microprocessor-based remote host controller 12a for providing system control for a corresponding node 14a in system 10. An identical remote host controller 12b is shown for a node 14b for sensor 16b. System 10 includes a requesting applications controller 30 which typically is a server that originates data requests to nodes 14a, 14b.

Each remote host controller 12a, 12b typically includes a microprocessor, random access memory, non-volatile memory, and input and output signal interfaces. The remote host controllers 12a, 12b provide control based on an application program loaded therein through a loading means (not shown). The application program for each remote host controller 12a, 12b is typically loaded as firmware stored in the non-volatile memory of the system, but is not limited to this form.

As shown in the system in FIG. 1, each remote host controller 12a, 12b interfaces with a corresponding wireless device 20a, 20b via a data interface shown as serial port 26a, 26b. Each wireless device 20a, 20b has a pre-determined protocol to enable communication with its corresponding remote host controller 12a, 12b. The protocol may be a defined command set and syntax for every command, or through addressable register settings of each remote host controller 12a, 12b. Each remote host controller 12a, 12b can be programmed to manage or control different parts of the system via a corresponding I/O interface 28a, 28b with the sensor(s) 16a, 16b. Each I/O interface 28a, 28b typically provides digital and analog interfaces for sensor(s) 16a, 16b. Sensor(s) 16a, 16b include, for example, but are not limited to, switches, meters, signal lights, status, and measurement indicators. Depending on the sensor equipment provided, each remote host controller 12a, 12b can be programmed by a user for various functions, for example, switching lights on and off through a digital I/O interface, polling temperature readings through analog to digital converter circuitry, or interacting with an operator on site through a user interface.

When data communication is required which is event driven or pre-scheduled, the remote host controller 12a, 12b typically issues commands to its connected wireless device to initiate a communication session with another wireless device. For applications using a wireless device for data communication, the microprocessor-based remote host controller 12a, 12b executes its stored application program for managing all necessary functions and for preparing a status report to be forwarded to the higher level requesting applications controller 30. The applications controller 30 interfaces with a wireless device 20c via a data interface shown as serial port 26c. The report is typically sent upon request through a wireless link to the wireless device 20c and forwarded via the data interface to application controller 30.

The wireless devices 20a, 20b, 20c in the system in FIG. 1 have usually been implemented as telephone line modems.

Using existing methods for telephone line modems, a dial-up connection is required before reading data or sending control information to a remote device. For requesting a reading of a sensor such as one of the sensor(s) 16a, 16b, application controller 30 must "call" the corresponding wireless device 20a, 20b using the wireless device 20c and request the called device to read the corresponding sensor and return the requested data. An exemplary sensor reading process for the prior art system 10 requires the following steps: making a call using a modem ATD command; connecting after a training session; the calling wireless device 20c sends a request for a sensor reading to one of the wireless devices 20a, 20b; the called device 20a or 20b sends the request to the corresponding remote host controller 12a or 12b which reads the corresponding sensor 16a or 16b. The sensor reading is then coupled back to the calling device 20c via the called device 20a-20b, and finally the link is disconnected. This procedure is slow and may require one or more seconds to complete.

A drawback of the system shown in FIG. 1 is that, when a application controller 30 needs to collect data from hundreds of sensors via their corresponding wirelessly linked device, the application controller 30 must separately "call" and establish a connection to each wireless device 20a, 20b, etc. in order to obtain the requested data. Each connection requires repeat of the above sensor reading process which requires a few seconds of time for each sensor. This time is required for each sensor, even if only a few bytes of data are requested from each sensor. A need exists therefore to reduce the time required to collect data from a large number of wirelessly linked devices.

In parallel with this growth in speed and complexity of communications, embedded control of processes and functions, via analog and digital sensors and actuators, in machines and other devices has expanded rapidly. Typically remote host microcontrollers are needed for each wireless device and sensor node. A need exists to reduce cost and device size by eliminating separate host microcontrollers for each sensor node. A wireless embedded communications system and method is therefore needed which solves the above described drawbacks of the prior art.

SUMMARY OF THE INVENTION

The present invention provides a method and corresponding wireless embedded communications system which overcomes the drawbacks of known systems and methods.

Broadly stated, the present invention provides a system for enabling remote management of data from a plurality of devices, the system having an application controller and comprising two or more wireless modules each having a wireless transceiver and a communications controller; wherein a first one of the wireless modules is coupled to the application controller via a digital bus for communication therewith, the first one of the wireless modules for receiving a command from the application controller via the digital bus and sending the command to a predetermined one of the other wireless modules via a wireless link based on the command; each of the other wireless modules is coupled to one or more of the devices via an I/O bus; the predetermined one of the other wireless modules receiving the command via the wireless link and, responsive as a function of the command, for communicating with one or more of the devices coupled thereto via the I/O bus, for generating a response based on the communication, and for transmitting the response to the first one of the two or more wireless modules via the wireless link; the first one of the two or more wireless modules for receiving the response from the predetermined one of the other wireless modules via the wireless link and for forwarding the response to the application controller via the digital bus.

Broadly stated, according to another embodiment, in a system including an application controller, a plurality of sensors; and two or more wireless modules each having a wireless transceiver and a communications controller, a first one of the wireless modules coupled to the application controller via a digital bus for communication therewith, each of the other wireless modules coupled to one or more of the sensors via an I/O bus, the present invention provides a method for enabling remote management of a plurality of sensors, comprising the steps of receiving by a first one of the wireless modules a command from the application controller; transmitting by the first one of the wireless modules the command to a predetermined one of the other wireless modules via a wireless link, the predetermined one determined based on the command; receiving by the predetermined one of the other wireless modules the command via the wireless link; communicating as a function of the command by the predetermined one of the other wireless modules with one or more of the sensors via the I/O bus; generating by the predetermined one of the other wireless modules a response based on the communicating; transmitting by the predetermined one of the other wireless modules the response to the first one of the two or more wireless modules via the wireless link; receiving by the first one of the two or more wireless modules the response; and forwarding by the first one of the two or more wireless modules the response to the application controller via the digital bus.

According to a preferred embodiment, the present invention provides a method for enabling remote management of data, in a system having including an application controller, a plurality of sensors; and two or more wireless modules each having a wireless transceiver and a communications controller, a first one of the wireless modules coupled to the application controller via a digital bus for communication therewith, each of the other wireless modules coupled to one or more of the sensors via an I/O bus, the present invention provides a method for enabling remote management of a plurality of sensors, comprising the steps of receiving by a first one of the wireless modules a command from the application controller; broadcasting by the first one of the wireless modules the command to the other wireless modules via a wireless link; receiving by the other wireless modules the command via the wireless link; communicating as a function of the command by the other wireless modules with one or more of the sensors via the I/O bus; wherein each the other wireless modules has a predetermined unique identifier, generating by the other wireless modules a response based on the communicating; transmitting by each of the other wireless modules its response via the wireless link in a predetermined sequence and during a predetermined time slot as a function of the predetermined unique identifier; and receiving by the first one of the wireless modules the responses and transmitting the responses to the application controller.

An advantage of the present invention is that it eliminates the need for a separate application microcontroller associated with each sensor. The present invention enables direct connection of sensors to a wireless device having a transceiver and an embedded communications controller. The present invention enables sensor management and control capabilities to be embedded into the communications controller of the wireless device so as to enable direct connection from the wireless device to the sensor, eliminating the separate application host microcontroller. In other words, the present invention enables a single controller in the wireless device to manage wireless communication, modem operation, and sensor monitoring/control functions so as to eliminate the applications host microcontrollers. As a result, equipment cost is reduced because there is no need for separate microcontrollers to remotely control a number of analog and digital sensor devices in a given system.

The present invention has the further advantage of enabling tailoring of a user application for a particular sensor by enabling user programming through the use of AT commands. Another advantage of the present invention is that it reduces programming and software costs for a user through the use of a simple, familiar command structure in the form of AT commands.

Another advantage of the present invention is that it significantly improves efficiency by providing a broadcast command to enable more rapid status and data acquisition from a large number of sensor nodes. This advantage is particularly evident in inventory and status monitoring applications requiring monitoring of a number of remote sensors in devices.

The present invention has the advantage of enabling a reduction in the number of telephone lines required to monitor remote sensors.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein, with reference symbols common to more than one Figure indicating like components, aspects or features shown therein.

DETAILED DESCRIPTION OF THE INVENTION

The present invention will now be described in more detail with reference to FIGS. 2-8. The term "wireless device" herein refers to a device for wireless data communication purposes that functions as the "carrier" for the system and method according to embodiments of the present invention. The term "wireless device" is also referred to herein as a "wireless module" or "wireless communication device".

Figure 2:
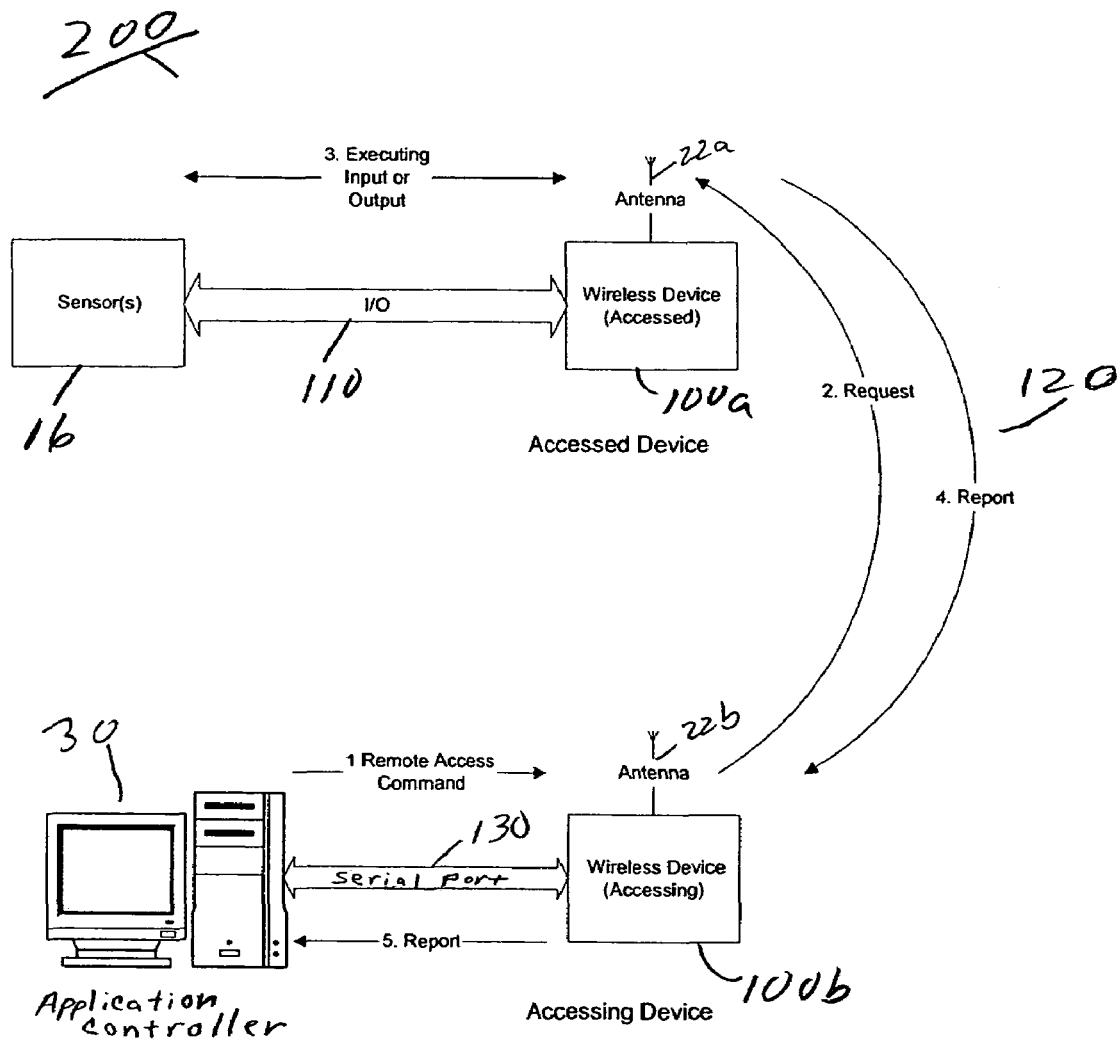
FIG. 2 is a block diagram depicting a system and method for direct I/O access over a wireless link according to an embodiment of the present invention.

FIG. 2 is a block diagram illustrating a system and method for direct I/O access over a wireless link according to an embodiment of the present invention. System 200 includes an application controller 30 which requests data and receives data. The application controller 30 interfaces with a wireless device 100b via a digital bus, preferably serial port 130, as shown in FIG. 2. System 200 includes wireless device 100a connected via an I/O interface 110 to a plurality of sensors shown as 16 in FIG. 2. Wireless devices 100a, 100b operate according to the method of the present invention in system 200. The wireless devices 100a and 100b include an antenna 22a, 22b and an embedded transceiver and controller combination for operation according to the method of the present invention. The I/O interface 110 preferably provides both digital and analog interfaces with sensor(s) 16.

The terms "sensor" and "sensors" as used herein refers to equipment that can be remotely monitored and is not limited to only sensors. Examples of sensor(s) 16 and applications which can be used to practice the present invention include, but are not limited to, switches, cashless vending machine clusters, switches, appliances, utility meters, self-service car washes, signal lights, measurement indicators, remote dispensing stations; environmental monitoring equipment; athletic field lighting; and remote access control.

For instance, the wireless device 100a can be remotely controlled from the application controller for various specific functions for the specific sensor(s) 16, e.g., turning lights on/off through a digital I/O interface, polling temperature readings through analog to digital converter circuitry, or interacting with an operator on site through a user interface.

FIG. 2 also shows the sequence of the data flow between the different devices in the system. Though in the exemplary embodiment in FIG. 2 only one sensor(s) 16 is shown, the present invention supports a plurality of sensors for each wireless device shown in FIG. 2. The device 100a is shown in FIG. 2 as an "accessed" device. Wireless device 100b is shown as an "accessing" device. The accessing wireless device 100b and accessed wireless device 100a communicate via a wireless link 120. An exemplary process according to the embodiment shown in FIG. 2 is now described in more detail.

In Step 1 of FIG. 2, the application controller 30 linked via a data interface, shown as serial port 130, to the accessing wireless device 100b issues a remote access command to wireless device 100b. The command from the application controller 30 in system 200 is either event driven or sent at predetermined intervals depending on the application. In Step 2, in response to the command, the accessing wireless device 100b transmits a request packet to the accessed wireless device 100a over a wireless link 120. In Step 3, for executing input or output, the accessed wireless device 100a receives the request packet, determines its required action to fulfill the request in the request packet and manages accomplishment of the required action through I/O channels 110 to one or more sensors(s) 16. Preferably each wireless device can service requests for up to six sensors using the digital and analog channels in I/O channel 110.

In Step 4, the accessed wireless device 100a transmits a report in a report data packet back to the accessing wireless device 100b. The accessing wireless device 100b receives the report data packet from the accessed wireless device 100a via the wireless link 120. In Step 5, the accessing wireless device 100b forwards the report in the report data packet to application controller 30 via the serial interface.

The accessing wireless device 100b is not limited to one particular device in a wireless network. Preferably, any of the wireless devices according to the system and method of the present invention is user programmable to initiate the direct I/O accessing process of Steps 1-5 above.

Figure 1:
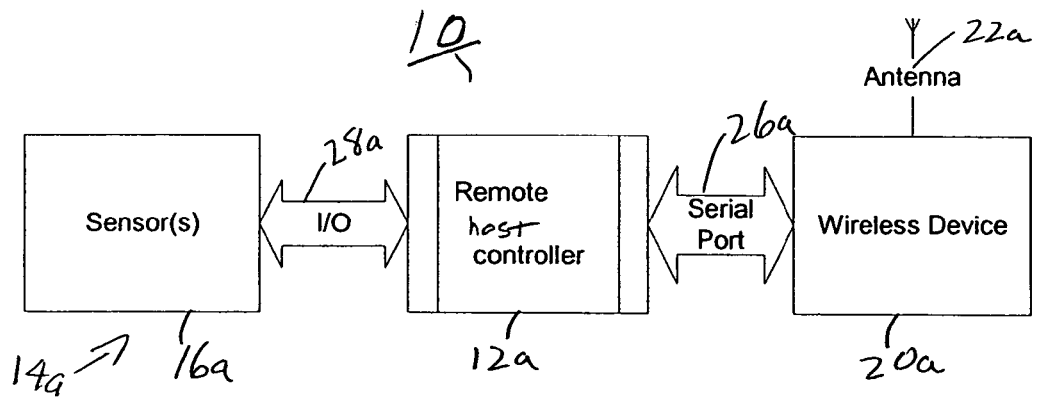
FIG. 1 is a block diagram depicting an exemplary prior art system using wireless devices for local data communications.
Figure 1:
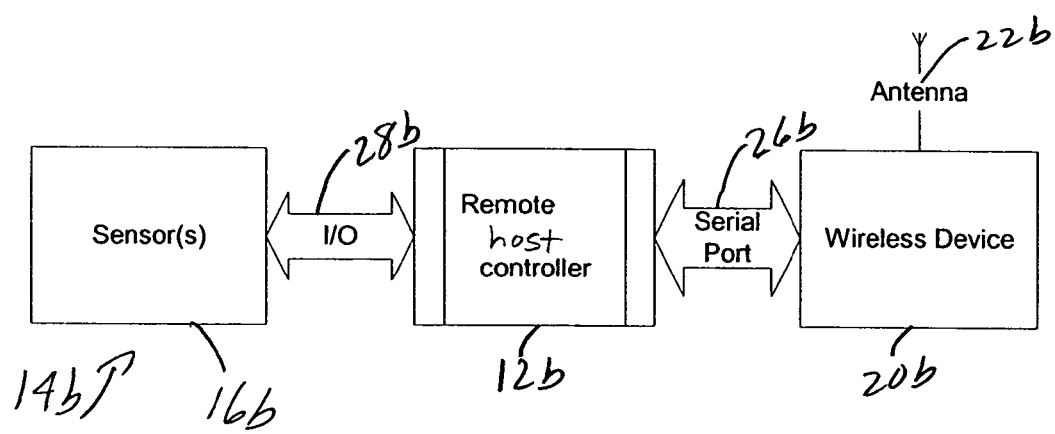
Figure 1:
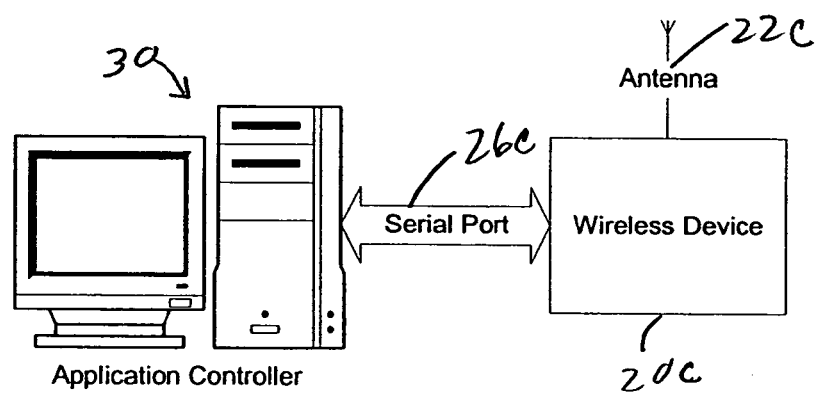

As shown in the exemplary system in FIG. 2, the system and method of the present invention enables direct connection of sensor(s) 16 to a wireless device 100a eliminating the need for a separate microcontroller 12a, 12b in the system in FIG. 1. Wireless device 100a includes a transceiver having an embedded communications microcontroller. The wireless device according to the present invention, and in particular the communications controller therein, is user programmable, preferably through the use of predetermined extensions of the modem AT command set. The present invention eliminates the need for a separate application microcontroller 12a, 12b shown in FIG. 1. Sensor management and control capabilities are embedded into an existing communications controller in wireless device 100a, 100b so as to enable direct connection to a plurality of sensors without the need for the separate microcontroller. As a result, equipment cost is reduced by eliminating the need for separate microcontrollers to control a number of analog and digital sensor devices in a remote equipment application.

Figure 3:
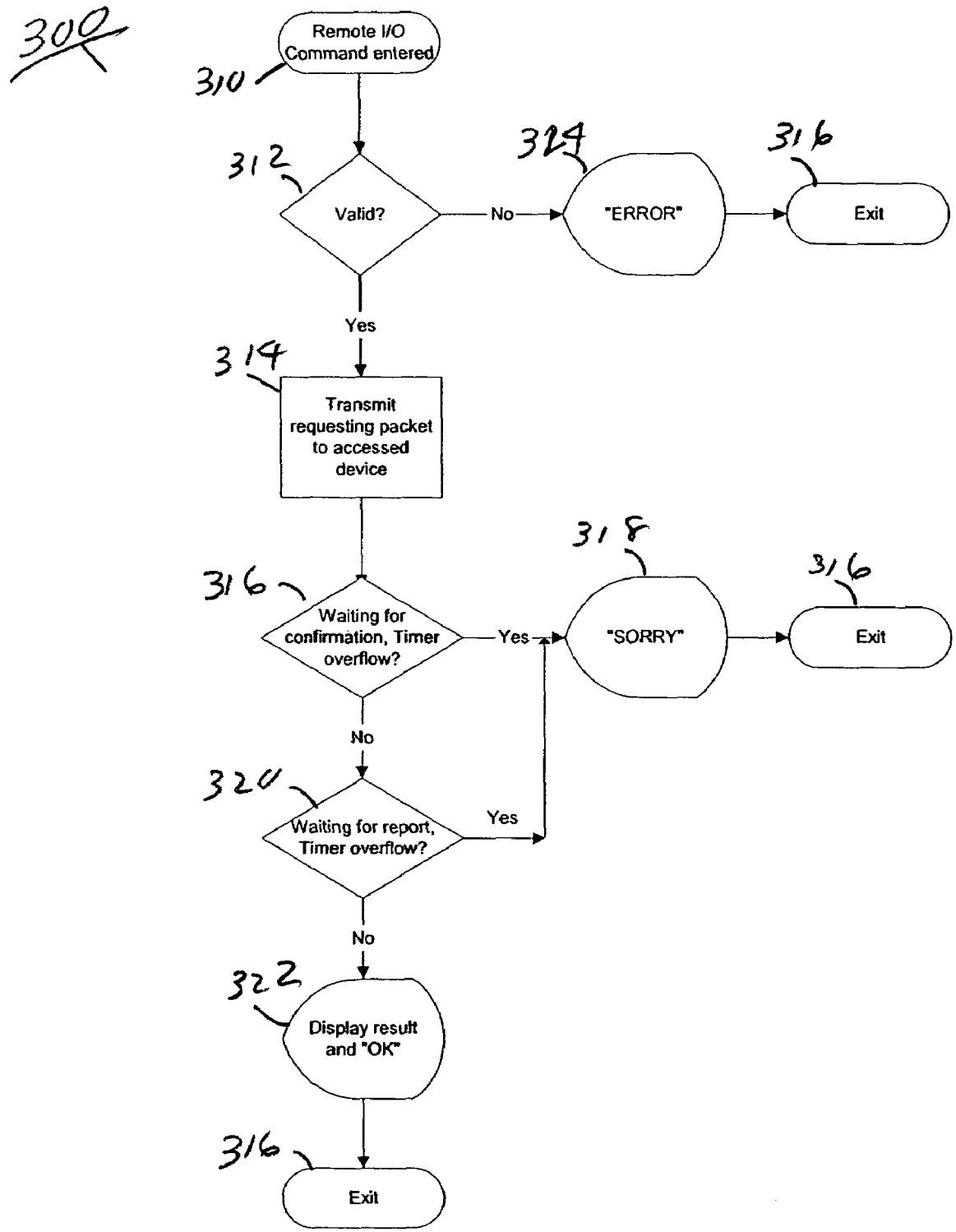
FIG. 3 is a flow chart illustrating the method for the system in FIG. 2 for the accessing wireless device according to an embodiment of the present invention.

FIG. 3 is a flow chart illustrating the method for the system in FIG. 2 for the accessing wireless device 100b according to an embodiment of the present invention. In Step 310 of FIG. 3, a received remote I/O command from applications controller 30, in Step 1 in FIG. 2, is entered. In Step 312, a determination is made as to whether the command is valid. If the command is not valid, Step 324 is executed wherein an error indication is given and the process exits at Step 316. In Step 314, wireless device 100b transmits the command in the form of a requesting packet to accessed wireless device 100a. In Step 316, the accessing wireless device 100b waits for confirmation of the transmission of the requesting packet and checking for timer overflow. The timer overflow is checked to determine if a preselected time interval, depending on the application and sensor, has been exceeded after the requesting packet was transmitted. Step 318 is executed if a timer overflow condition occurs and preferably an indication, e.g., "SORRY", is displayed to the user and the process exits at Step 316. Step 320 is executed if confirmation is received before the timer overflow condition occurs. In Step 320, a determination is made as to whether another timer overflow condition occurs while waiting for a report from the accessed wireless device. Step 318 is executed if a timer overflow condition occurs and alternatively an indication, e.g. "SORRY", is given to the user and the process exits at Step 316. Step 322 is executed if the report is received before the timer overflow condition occurs. In Step 322, preferably results of the report are displayed using a user interface along with a confirmation of receipt of the report, i.e. "OK", after which the process exits at Step 316.

Figure 4:
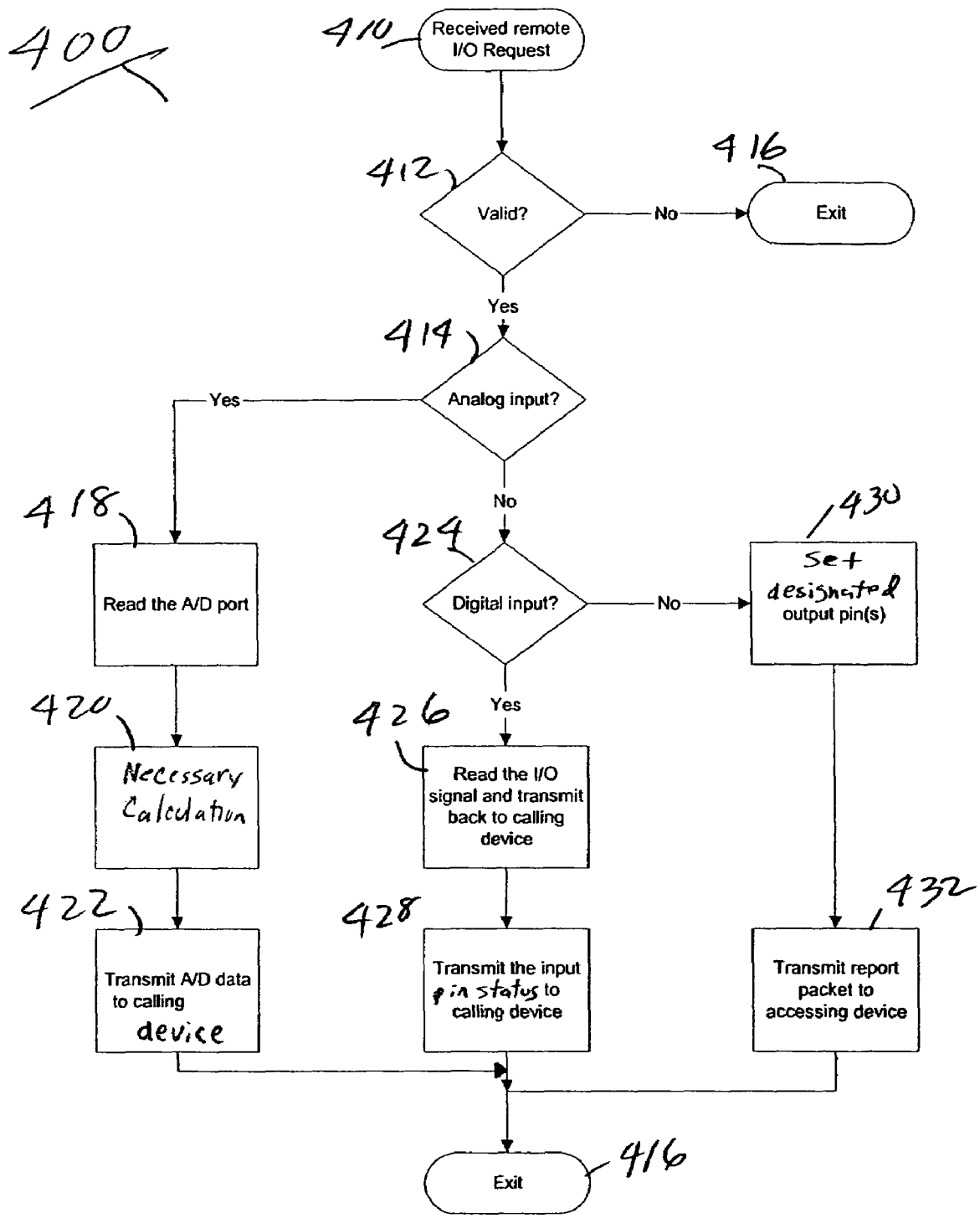
FIG. 4 is a flow chart illustrating the method for the system in FIG. 2 for the accessed wireless device according to an embodiment of the present invention.

FIG. 4 is a flow chart illustrating the method for the system in FIG. 2 for the accessed wireless device according to an embodiment of the present invention. In Step 410 of FIG. 4, wireless device 100a has received a remote I/O request from accessing wireless device 100b. In Step 412, a determination is made as to whether the request is valid. The process exits at Step 316 if the request is not valid. In Step 414, a determination is made as to whether an analog input from the sensor 16 is requested. If an analog input is requested, in Step 418, an analog-to-digital "A/D" port of the I/O channel 110 is read, and necessary calculations are performed in Step 420 to enable the analog input to be transmit in digital form as A/D data. After the necessary calculations in Step 420 are performed, in Step 422, the accessed wireless device 100a transmits the A/D data to the calling (accessing) wireless device 100b and the process exits at Step 416.

In FIG. 4, if it is determined in Step 414 that an analog input is not requested, at Step 424, a determination is made as to whether a digital input from the sensor is requested. In Step 430, preferably, designated output pins are set if neither an analog or digital input is requested, and, in Step 432 a report packet is transmit to the accessing wireless device 100b, after which the process exits at Step 416. If it is determined in Step 424 that a digital input is requested, at Step 426, the appropriate digital I/O signal on I/O channel 110 is read and the digital signal value is transmit to the calling (accessing) wireless device 100b. In Step 428, the accessed wireless device 100a also preferably transmits an input pin status to the calling (accessing) wireless device 100b and the process exits at Step 416.

For the present invention, control functions for the analog inputs and digital I/O's are performed by the communications controller within the wireless device 100a. Commands, preferably modem-like AT commands, are loaded through an interface (not shown) to program the functions of the analog and digital I/O lines for I/O channel 100. The AT commands used for programming for a particular application are stored in a memory of the wireless device 100a, preferably in flash memory. The command storage enables the wireless device 100a to be first programmed and then installed in a particular application. The communications controller in wireless device 100a uses the information stored in memory to control the analog and digital I/O lines of I/O channel 110.

Below is an exemplary list of the modem-like AT commands used for programming the functions of the analog and digital I/O lines for I/O channel 100 for the direct control of sensors using the communications controller in the wireless device 100a according to a preferred embodiment of the system and method of the present invention: S107—Defines the function of the programmable I/O lines of I/O channel 110. Preferably two analog input lines can also be defined as digital I/O lines if needed. Preferably four programmable digital I/O lines can be set as either inputs or outputs. The value of the S107 register is stored in memory within the wireless device 100a. "AT#IxxxAn?"—This command allows the value of Analog Input "n" on node address "xxx" to be read remotely; "AT#IxxxDn?"—This command allows the status of Digital I/O "n" on node address "xxx" to be read remotely. "AT#IxxxDn=z"—This command allows the condition of the local digital output "n" on node address "xxx" to be set remotely. When z=0 the output is set to a logic low; when z=1 the output is set to a logic high. The AT commands listed above are exemplary only, the present invention is not limited to the use of these specific commands.

For wireless communication, the communications controller in the wireless device 100a manages the wireless link. This management preferably also includes a frequency hopping algorithm for spread spectrum operation; collision avoidance, node addressing, and packetizing data. The communications controller allows support for point-to-point, point-to-multipoint or multipoint networks.

Figure 5:
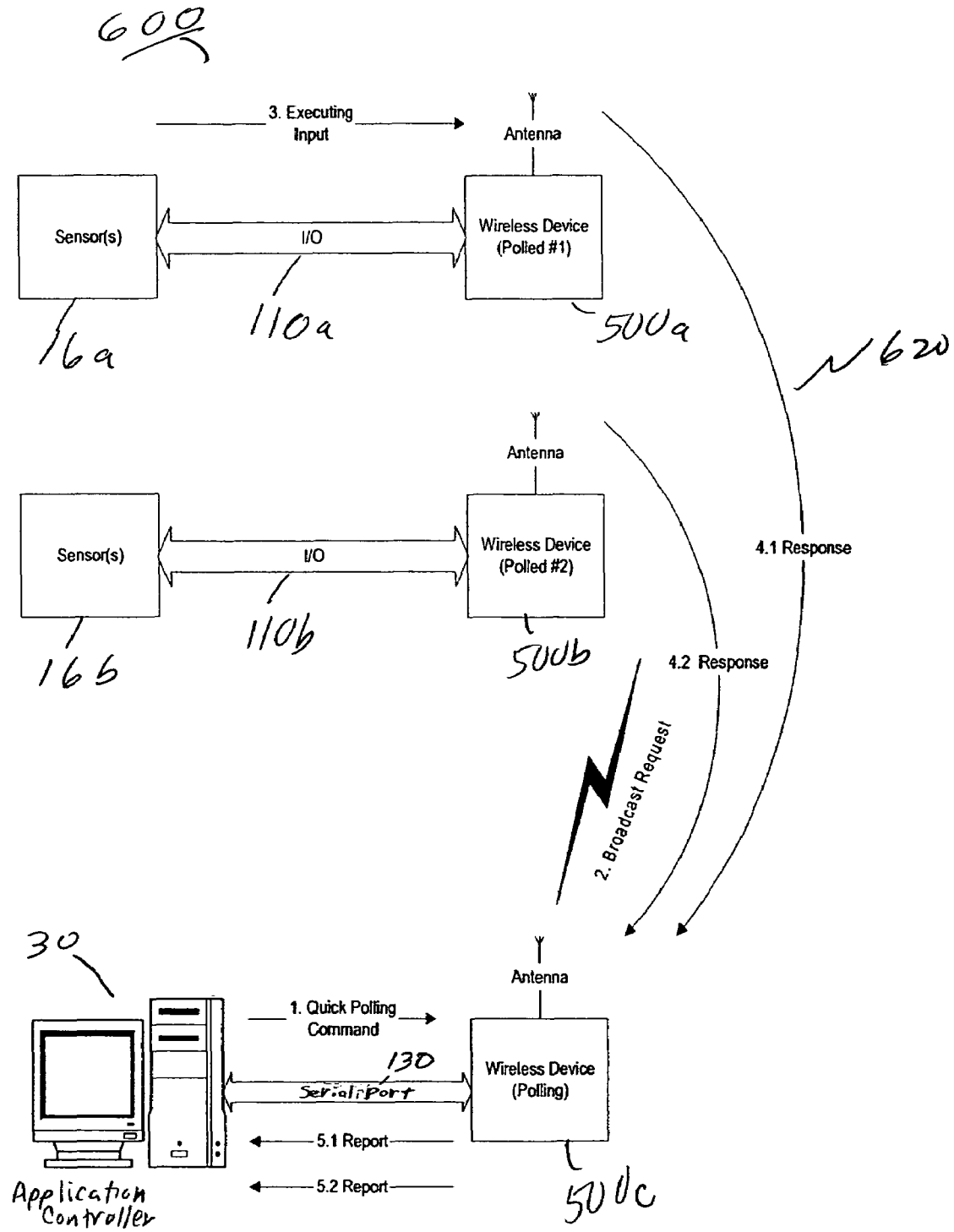
FIG. 5 is a block diagram depicting an exemplary system and method showing the sequence of the data flow between the devices, through the serial port interface or the wireless link, for the "quick polling" aspect according to an embodiment of the present invention.
Figure 6:
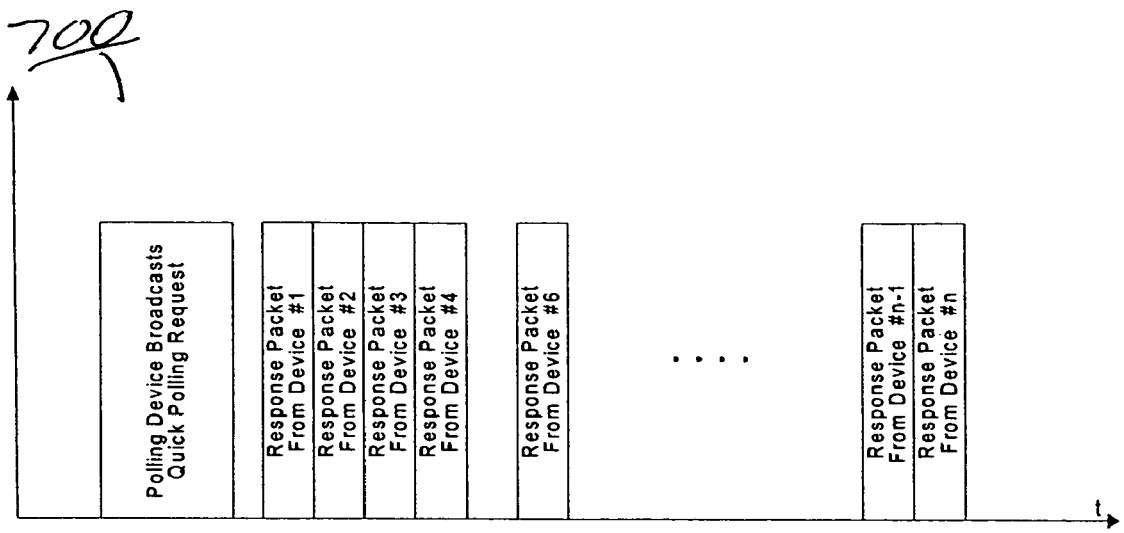
FIGS. 6a and 6b illustrate the time slots for the quick polling cycle response sequence according to an embodiment of the present invention.
Figure 6:
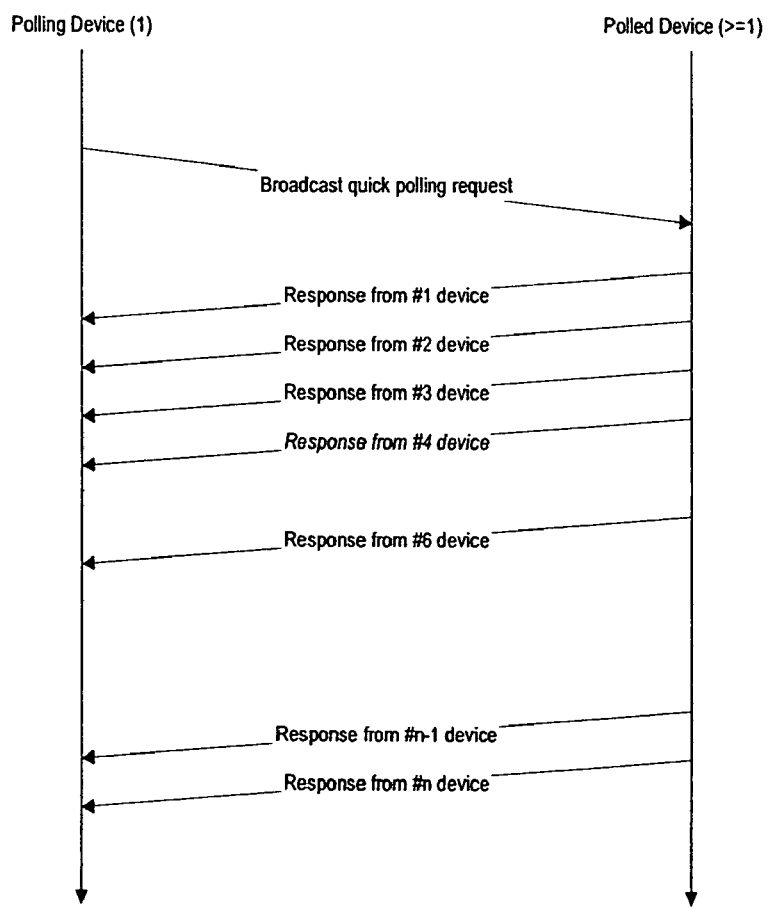

FIG. 5 is a block diagram depicting an exemplary system and method showing the sequence of the data flow between the devices, through the serial port interface or the wireless link for the quick polling aspect according to an embodiment of the present invention. Though in FIG. 5 only two polled devices are showed in the diagram, the scheme is designed for many polled devices are used. The quick polling aspect of the present invention is for reducing the time to collect data from hundreds of remote devices. By using wireless broadcasting and time-sharing multiplexing according to an embodiment of the method of the present invention, the time required for data acquisition is significantly reduced. In addition, since only a few commands are needed for the quick polling process, the process is simplified.

The wireless device launching a quick polling process is referred to in FIG. 5 as a polling wireless device shown as 500c. The wireless devices being polled in FIG. 5 are referred to herein as polled wireless devices shown as 500a, 500b.

For the present invention, every polled wireless device 500a, 500b is assigned a unique identifier, preferably a number, to manage its timing when responding to the polling wireless device 500c. Alternatively, the numbering system can be combined with a device ID system. Preferably numbers in sequence are use for the most efficient use of the method.

The system 600 in FIG. 5 includes a requesting applications controller 30 interfaced with a polling wireless device 100c via a serial port 130. System 600 includes polled wireless devices 500a, 500b each connected via a corresponding I/O interface 110a. 100b to a corresponding plurality of sensors 16a, 16b shown in FIG. 5. The I/O interface 110a, 110b preferably provide both digital and analog interfaces with the corresponding sensor(s) 16a, 16b. For the present invention, one polling wireless device is used to poll a plurality of polled wireless devices.

An exemplary process of the quick polling aspect according to the embodiment shown in FIG. 5 is now described in more detail. In Step 1 of FIG. 5, the applications controller 30 sends a quick polling command to wireless device 500c via a data interface, preferably a serial port 130 as shown. In Step 2 of FIG. 5, in response to the command, the accessing wireless device 500c broadcasts the request over a wireless link 620. For ensuring that all polled devices receive the request, multiple request packets are preferably broadcast. The number of packets is to ensure that all polled device are able to receive the request and prepare an appropriate response. Preferably, 3 to 5 request packets are sufficient to enable all polled devices to receive the request and prepare a response.

In Step 3 in the example in FIG. 5, the polled wireless device 500a receives the request packet, determines its required action to fulfill the request in the request packet and manages accomplishment of the required action through I/O channels 110a to one or more sensors(s) 16a. Preferably, each wireless device 500a can service requests for six sensors using digital and analog channels in I/O channel 110a.

For the embodiment in FIG. 5, a predetermined time slot is assigned for each polled device for transmission of data back to the polling wireless device 500c. In Steps 4.1 polled wireless device 500a transmits a report data packet back to the polling wireless device 500c in sequence according to the pre-determined time slot assigned for device 500a. In Step 4.2, polled wireless device 500b transmits its report data packet back in sequence according to its assigned pre-determined time slot. The response packets carry data, also referred to herein as payload data, back to the polling wireless device 500c. Payload data ranges from a few bytes long to a hundred bytes long.

The polling wireless device 500c receives the report packets one by one from the polled wireless devices as shown in FIG. 5. In Steps 5.1 and 5.2, polled wireless device 500c forward the corresponding report packet to applications controller 30. For the present invention, the polling wireless device is not limited to one particular device in the wireless network. Preferably, any of the wireless devices according to the system and method of the present invention is user programmable to initiate a direct I/O accessing process of the steps shown in FIG. 5.

Though there are only two polled devices in FIG. 5, hundreds of polled devices can be used in a real application, the number of polled wireless devices being limited only as a function of the polling time limitations for a particular application. The limitation is how long the quick polling command wants to wait. If a time slot is about 25 ms, wireless devices can be polled in 2.5 seconds.

FIGS. 6a and 6b illustrate the sequence and time slots for the quick polling cycle response sequence 700 for n polled wireless devices according to an embodiment of the present invention. In FIG. 6b, the broadcast quick polling request is shown being sent from a polling device to all n polled devices. The responses from the n devices are shown occurring in sequence. FIG. 6a illustrates this sequence showing the timing for the broadcast request and for each time slots for the n polled devices.

Figure 7:
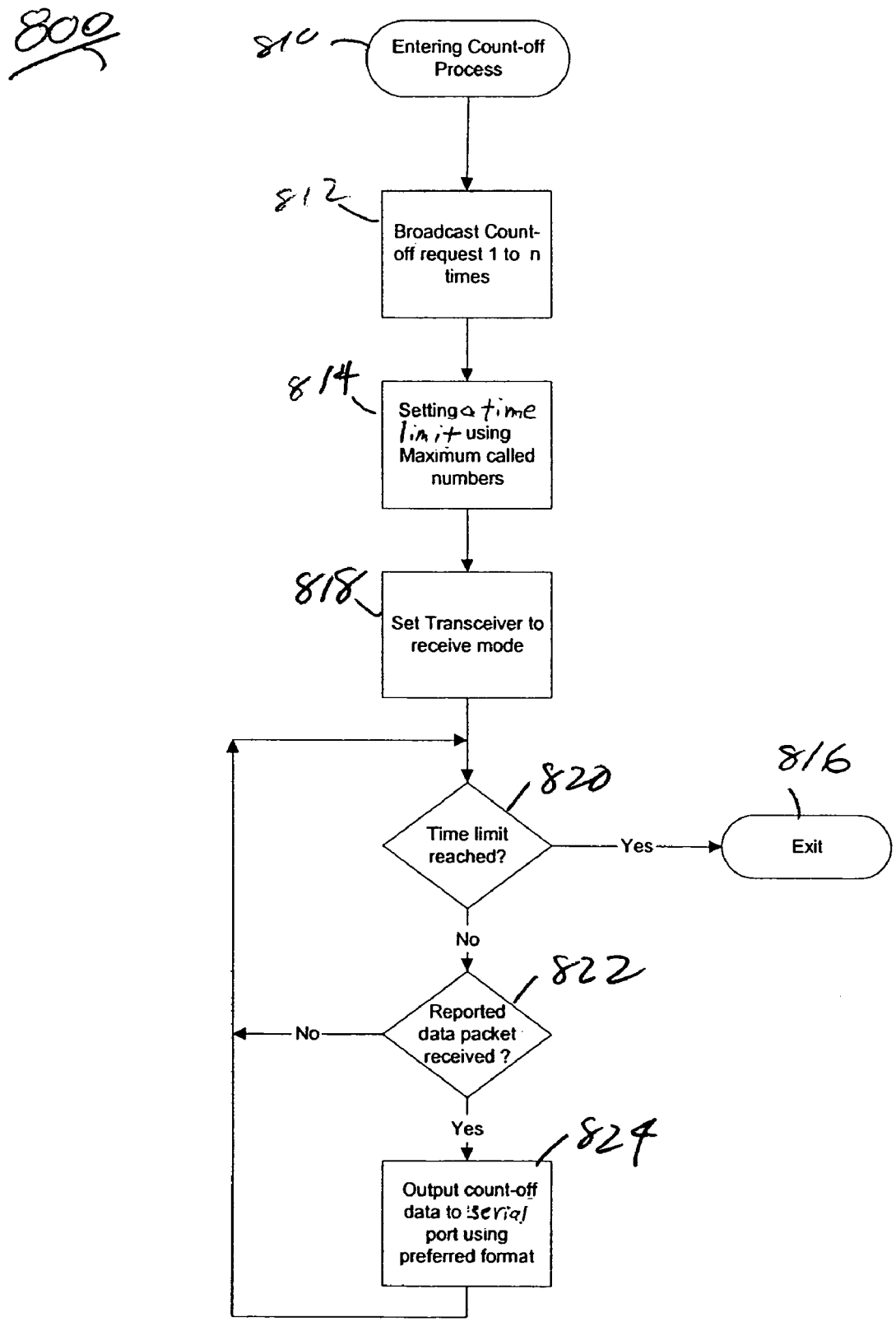
FIG. 7 is a flow chart illustrating the method for the system in FIG. 5 for the polling wireless device according to an embodiment of the present invention.

FIG. 7 is a flow chart illustrating the method 800 for the system in FIG. 5 for the polling wireless device according to an embodiment of the present invention. In Step 810, a quick polling command from applications controller 30, in Step 1 in FIG. 5, is received and wireless device 500c enters a polling process referred to as the "count-off" process. In Step 812, polling wireless device 500c broadcast the count-off request 1 to n times. The broadcast is made multiple times, preferably 3-5 times, for ensuring that all polled devices receive the request. Preferably, 3 to 5 request packets are sufficient to enable all polled devices to receive the request and prepare a response. In Step 814 the polling device sets up a time limit for a timeout period as a function of the maximum called numbers.

Step 818, the transceiver of polling wireless device 500c in FIG. 5, is set to receive mode. In Step 820, the polling wireless device 500c determines whether the time limit for responding has been reached. Step 816 is executed and the process exits if the time limit is reached. If the time limit has not been reached, Step 822 is executed wherein a determination is made as to whether it is reported that a data packet is received at polling wireless device 500c. If packet has not been received, the process proceeds to Step 820 to again determine if the time limit for responding has been reached. At Step 824, the output count-off data is sent from the polling wireless device to the serial port connected to applications controller 30 using a preferred format if the data packet is received.

Figure 8:
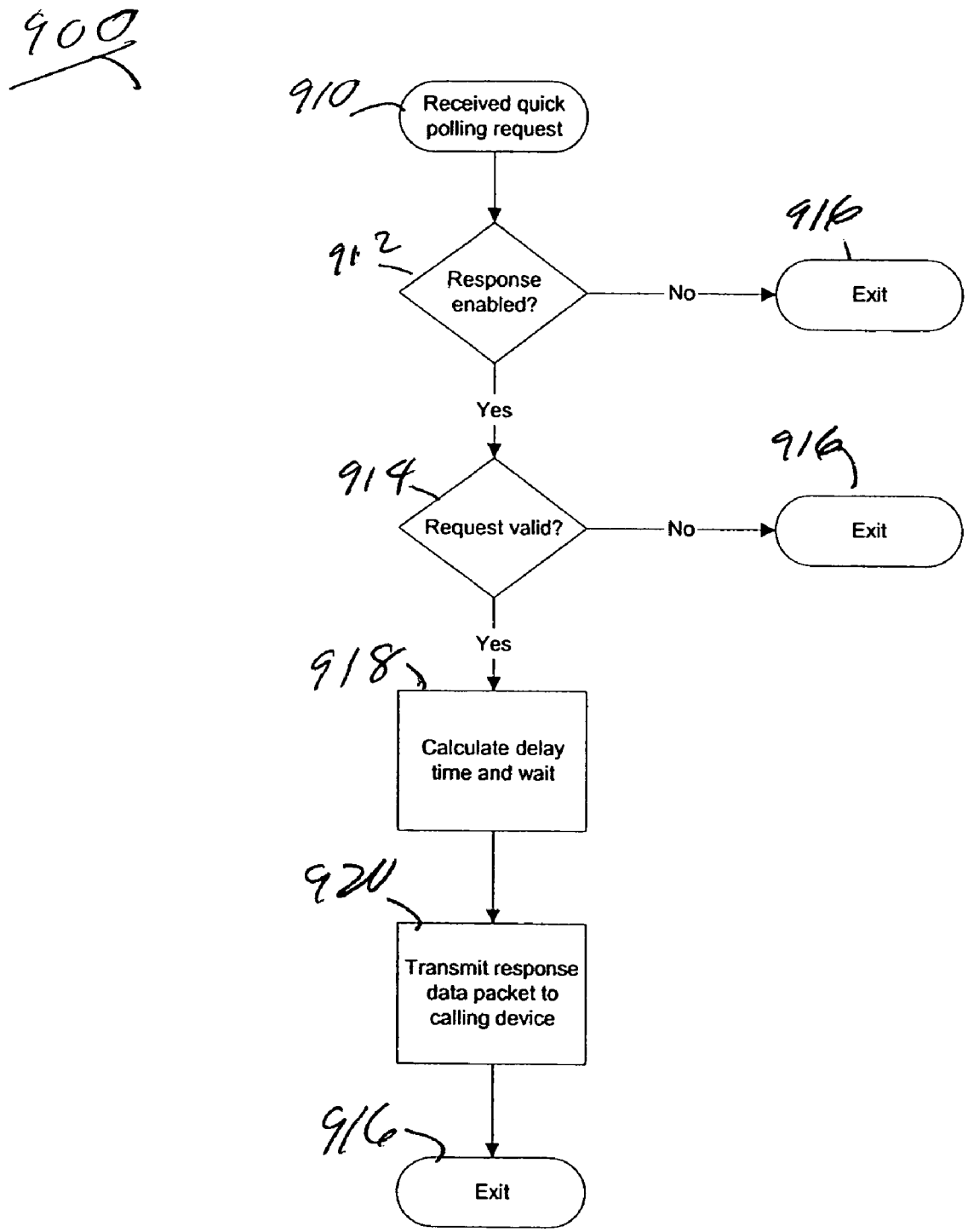
FIG. 8 is a flow chart illustrating the method for the system in FIG. 5 for the polled wireless device according to an embodiment of the present invention.

FIG. 8 is a flow chart illustrating a method 900 for the system in FIG. 5 for the polled wireless device according to an embodiment of the present invention. In Step 910, the polled wireless device 500a, 500b in FIG. 5 has received the quick polling request. In Step 912 a determination is made as to whether response is enabled. The process exits at Step 916 if response is not enabled for the polled device. In Step 914, if response is enabled, a determination is made as to whether the request is valid. The process exits at Step 916 if the request is invalid. In Step 918, the polled device calculates its delay time and waits therefore if the request is valid. This step is to ensure that the polled device transmits its report to the polling device only during the predetermined time slot for the particular polled device. In Step 920, the polled device transmits its response data packet to the calling (polling) device after waiting for the arrival of its predetermined time slot. The process exits in Step 916 after the polling device transmits its response in Step 920.

Having disclosed exemplary embodiments, modifications and variations may be made to the disclosed embodiments while remaining within the scope of the invention as described by the following claims.

What is claimed is:

1. In a system having an applications controller, a plurality of sensors, and two or more wireless modules each having a wireless transceiver and a communications controller, a first one of said wireless modules coupled to said applications controller via a digital bus for communication therewith, each of said other wireless modules coupled to one or more of said sensors via an I/O bus, a method for enabling remote management of a plurality of sensors, comprising the steps of:
receiving by said first one of said wireless modules a command from said applications controller;
transmitting by said first one of said wireless modules said command to a predetermined one of said other wireless modules via a wireless link, said predetermined one determined based on said command;
receiving by said predetermined one of said other wireless modules said command via said wireless link;
communicating as a function of said command by said predetermined one of said other wireless modules with one or more of said sensors via said I/O bus;
generating by said predetermined one of said other wireless modules a response based on said communicating;
transmitting by said predetermined one of said other wireless modules said response to said first one of said two or more wireless modules via said wireless link;
receiving by said first one of said two or more wireless modules said response; and
forwarding by said first one of said two or more wireless modules said response to said applications controller via said digital bus,
wherein said I/O bus comprises a plurality of channels connected directly to a respective one of said other wireless modules, and said command identifies a selected one of the plurality of channels by which to exchange data with an associated one of said sensors coupled to said selected channel.

2. The method of claim 1, wherein said command is an extension of the predefined modem AT command set.

3. The method of claim 1, wherein said wireless modules are user programmable and said step of transmitting said command to a predetermined one of said other wireless modules is executable by any of said other wireless modules as a function of user programming.

4. The method of claim 1, wherein said step of transmitting by said first one of said wireless modules said command comprises broadcasting said command to each of said other wireless modules, each of said other wireless modules transmitting its response according to a predetermined sequence, and said first one of said wireless modules receiving said responses and transmitting said responses to said applications controller.

5. The method of claim 4, wherein each of said wireless modules has a predetermined unique identifier, each of said other wireless modules transmitting its response during a predetermined time slot as a function of said predetermined unique identifier.

6. In a system having an applications controller, a plurality of sensors, and two or more wireless modules each having a wireless transceiver and a communications controller, a first one of said wireless modules coupled to said applications controller via a digital bus for communication therewith, each of said other wireless modules coupled to one or more of said sensors via an I/O bus, a method for enabling remote management of a plurality of sensors, comprising the steps of:
receiving by said first one of said wireless modules a command from said applications controller;
transmitting by said first one of said wireless modules said command to a predetermined one of said other wireless modules via a wireless link, said predetermined one determined based on said command;
receiving by said predetermined one of said other wireless modules said command via said wireless link;
communicating as a function of said command by said predetermined one of said other wireless modules with one or more of said sensors via said I/O bus;
generating by said predetermined one of said other wireless modules a response based on said communicating;
transmitting by said predetermined one of said other wireless modules said response to said first one of said two or more wireless modules via said wireless link;
receiving by said first one of said two or more wireless modules said response; and
forwarding by said first one of said two or more wireless modules said response to said applications controller via said digital bus,
wherein said I/O bus comprises digital and analog channels, and
wherein the command identifies a selected one of said channels by which to exchange data with an associated one of said sensors coupled to said selected channel.

7. The method of claim 6, wherein said command is an extension of the predefined modem AT command set.

8. The method of claim 6, wherein said wireless modules are user programmable and said step of transmitting said command to a predetermined one of said other wireless modules is executable by any of said other wireless modules as a function of user programming.

9. The method of claim 6, wherein said step of transmitting by said first one of said wireless modules said command comprises broadcasting said command to each of said other wireless modules, each of said other wireless modules transmitting its response according to a predetermined sequence, and said first one of said wireless modules receiving said responses and transmitting said responses to said applications controller.

10. The method of claim 9, wherein each of said wireless modules has a predetermined unique identifier, each of said other wireless modules transmitting its response during a predetermined time slot as a function of said predetermined unique identifier.

11. In a system having an applications controller, a plurality of sensors, and two or more wireless modules each having a wireless transceiver and a communications controller, a first one of said wireless modules coupled to said applications controller via a digital bus for communication therewith, each of said other wireless modules coupled to one or more of said sensors via an I/O bus, a method for enabling remote management of a plurality of sensors, comprising the steps of:

receiving by said first one of said wireless modules a command from said applications controller;

transmitting by said first one of said wireless modules said command to a predetermined one of said other wireless modules via a wireless link, said predetermined one determined based on said command;

receiving by said predetermined one of said other wireless modules said command via said wireless link;

communicating as a function of said command by said predetermined one of said other wireless modules with one or more of said sensors via said I/O bus;

generating by said predetermined one of said other wireless modules a response based on said communicating;

transmitting by said predetermined one of said other wireless modules said response to said first one of said two or more wireless modules via said wireless link;

receiving by said first one of said two or more wireless modules said response;

forwarding by said first one of said two or more wireless modules said response to said applications controller via said digital bus;

pre-programming said predetermined one of said other wireless modules with a set of commands, the pre-programming further including defining one or more channels of said I/O bus, the set of commands allowing data to be exchanged with sensors via the defined channels; and selecting said command from said set of commands pre-programmed in said predetermined one of said other wireless modules.

12. The method of claim 11, wherein said step of transmitting by said first one of said wireless modules said command comprises broadcasting said command to each of said other wireless modules, each of said other wireless modules transmitting its response according to a predetermined sequence, and said first one of said wireless modules receiving said responses and transmitting said responses to said applications controller.

13. The method of claim 12, wherein each of said wireless modules has a predetermined unique identifier, each of said other wireless modules transmitting its response during a predetermined time slot as a function of said predetermined unique identifier.

* * * * *